United States Patent
Pannier et al.

[11] Patent Number: 5,643,453
[45] Date of Patent: Jul. 1, 1997

[54] PROCESS FOR THE TREATMENT OF LIQUID EFFLUENTS BY ACTIVATED SLUDGE

[75] Inventors: Michele Pannier, Croissy/Seine; Pavel Chudoba, Le Pecq, both of France

[73] Assignee: Degremont, Rueil-Malmaison, France

[21] Appl. No.: 457,698

[22] Filed: Jun. 1, 1995

[30] Foreign Application Priority Data

Jun. 2, 1994 [FR] France .................. 94 06765

[51] Int. Cl.$^6$ .................. C02F 3/30; C02F 3/12
[52] U.S. Cl. .................. 210/605; 210/616; 210/623; 210/631; 210/903
[58] Field of Search .................. 210/605, 615, 210/616, 620, 623, 630, 631, 903, 906

[56] References Cited

U.S. PATENT DOCUMENTS

| | | | |
|---|---|---|---|
| 3,928,191 | 12/1975 | Belasco | 210/616 |
| 3,968,036 | 7/1976 | Liles et al. | 210/616 |
| 4,221,657 | 9/1980 | Lebesgue | 210/616 |
| 4,271,013 | 6/1981 | Bhattacharyya | 210/631 |
| 4,731,185 | 3/1988 | Chen et al. | 210/605 |
| 4,786,413 | 11/1988 | Reimann et al. | 210/616 |
| 4,832,847 | 5/1989 | Fujii et al. | 210/616 |
| 4,919,815 | 4/1990 | Copa et al. | 210/631 |
| 5,192,441 | 3/1993 | Sibony et al. | 210/605 |

FOREIGN PATENT DOCUMENTS

| | | | |
|---|---|---|---|
| 0175568 | 3/1986 | European Pat. Off. | 210/616 |
| 203897 | 11/1983 | German Dem. Rep. | 210/616 |
| 212951 | 8/1984 | German Dem. Rep. | 210/616 |
| 55-86586 | 6/1980 | Japan | 210/616 |
| 56-141898 | 11/1981 | Japan | 210/616 |
| 60-31892 | 2/1985 | Japan | 210/616 |
| 60-206494 | 10/1985 | Japan | 210/605 |
| 1-218691 | 8/1989 | Japan | 210/605 |

OTHER PUBLICATIONS

Websters II New Riverside University Dictionary, 1994.

*Primary Examiner*—Peter A. Hruskoci
*Assistant Examiner*—Theodore M. Green
*Attorney, Agent, or Firm*—Pollock, Vande Sande & Priddy

[57] ABSTRACT

Process for the treatment of liquid effluents, such as waste water, for the purpose of removal of carbon, nitrogen and phosphorus pollution using an activated sludge, according to which the effluent, after having been subjected to mechanical pretreatments, is brought into contact with the activated sludge. The effluent/activated sludge mixture is the subjected to clarification/settling in order to separate the treated water from the thickened sludge, the latter then being recycled at the head of the aeration treatment and the excess sludge being continuously discharged. An inert material of inorganic origin is injected into the activated sludge, this material being immediately and homogeneously dispersed in the activated sludge, in order to create a mixed culture containing both, and in a single bacterial floc, free heterotrophic species and autotrophic species partially fixed on the particles of the said material within the floc. The structure of the latter contains in the order of 40 to 65% of organic matter, the remainder being the said inert material, consisting of one or a number of particles of the said material surrounded by activated sludge. The extraction of the excess sludge is carried out continuously and without separation of the injected material.

11 Claims, 2 Drawing Sheets

PROCESS FOR THE TREATMENT OF LIQUID EFFLUENTS BY ACTIVATED SLUDGE

FIELD OF THE INVENTION

The present invention relates to a process for the treatment of liquid effluents, in particular of waste water, by activated sludge.

BACKGROUND OF THE INVENTION

Currently, and despite intensive development of fixed-culture processes, the majority of urban water treatment plants are equipped for the purpose of the use of the activated sludge process. In France, such a process provides for the treatment of approximately 80% of the total volume of discharged municipal effluents. The principle on which this process is based is that of the removal of carbon, nitrogen and phosphorus pollution from waste water using a complex culture of microorganisms, known as activated sludge. Waste water, after having been subjected to mechanical pretreatment stages, is brought into contact with the activated sludge in the presence of oxygen and the pollution is transferred from the liquid phase (waste water) to the solid phase (activated sludge). After the contact time necessary for the biochemical reactions which take place during the treatment, the mixture of water and sludge is conveyed to the clarifier, in order to be subjected therein to a final treatment stage: separation of the sludge and the treated water by settling. The settled sludge is then thickened in order subsequently to be recirculated to the head of the aeration tank, in order to take part therein in a new treatment cycle. This cycle is continually repeated. The pollution transferred into the solid phase is discharged in the form of excess sludge, which is extracted continuously.

An activated sludge is defined as being a mixture of different microbial species, such as bacteria, fixed or free protozoa, metazoa, fungi and algae. The microorganisms together form structured colonies in the form of flakes, which constitute the essential form for correct settling. The size and the nature of the flocs are determined by the operating conditions applied to the process.

The correct operation of the activated sludge process depends strictly on the operating conditions, such as the applied load, the age of the sludge, the hydraulic detention time, and others, applied to the system. In fact, these conditions have an influence on the selection of the microbial species of the activated sludge and consequently they determine the quality of it. The quality of the sludge and its composition influence, in their turn, the abilities of the sludge to settle. The stage which limits the activated sludge process is thus very often the separation by settling, this limitation resulting from the poor settling abilities of certain sludges. These problems are indicated by incidents due to filamentous bulking. In fact, under certain operating conditions, the activated sludge contains high amounts of microorganisms, known as filamentous microorganisms, which are characterized by a poor settling ability.

Moreover, when the activated sludge process has to provide for partial or complete removal of the nitrogen, the selection pressure resulting from the operating conditions has to provide for the presence both of species providing for the nitrification stage (autotrophic bacteria) and species responsible for denitrification (heterotrophic bacteria). Given the very different rates of growth of these two types of bacteria, it is not always obvious to apply optimum conditions in order to provide for the presence, in sufficient number, of the two populations. Again, it is noticed that the selection pressure and the microbial population dynamics play a decisive role in the process for the treatment of waste water by activated sludge.

With the aim of improving the operation and the performance of the activated sludge process, different techniques and variants, such as in particular hydraulic flow modifications, aeration system modifications or additions of different materials, have been proposed.

The modifications in the flow consist of the incorporation of selectors or of contact regions at the head of the aeration tank with the aim of creating the concentration gradient and of thus modifying the selection pressure exerted on the microbial species.

The additions of different materials, such as active charcoal (PAC), anthracite or diatomaceous earth, have the aim of improving, on the one hand, the removal of biologically resistant compounds or of bacterial inhibitors by their adsorbtion on the added material and, on the other hand, they contribute to a better formation of the flocs of activated sludge. These materials also act as support materials for bacterial growth on their surface. As a general rule, all the materials thus added are, after the treatment process, recovered and regenerated in order to be able to be reinjected into a new treatment cycle. Given their sometimes very high price, their constant loss in a significant amount cannot generally be envisaged, despite the costs related to their recovery and regeneration (in particular in the case of PAC).

Examples of the prior state of the art mentioned above will be found in particular in the following publications: U.S. Pat. No. 1,617,014 (addition of diatomaceous earth), FR-B-1,411,792 (addition of inorganic materials such as sand) or U.S. Pat. No. 2,059,286 (injection of PAC active charcoal).

BRIEF DESCRIPTION OF THE INVENTION

Starting from this state of the art, the present invention proposes the use of an inert material of inorganic origin, in particular with the aim of rehabilitating existing activated sludge plants which are currently overloaded or which present problems, in particular hydraulic and/or biological problems.

This invention consequently relates to a process for the treatment of liquid effluents, in particular of waste water, for the purpose of removal of carbon, nitrogen and phosphorus pollution using an activated sludge, according to which the effluent, after having been subjected to mechanical pretreatments, is brought into contact with the activated sludge. The effluent/activated sludge mixture is then subjected to a clarification/settling in order to separate the treated water from the thickened sludge, the latter then being recycled at the head of the aeration treatment and the excess sludge being continuously discharged, this process being characterized in that an inert material of inorganic origin is injected into the activated sludge. This material is immediately and homogeneously dispersed in the activated sludge, in order to create a mixed culture containing both, and in a single bacterial floc, free heterotrophic species and autotrophic species partially fixed on the particles of the said material within the floc, the structure of the latter, which contains in the order of 40 to 65% of organic matter, the remainder being the said inert material, consisting of one or a number of particles of the said material surrounded by activated sludge, and in that the extraction of the excess sludge is carried out continuously and without separation of the injected material.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

According to a preferred embodiment of the process of the invention, the inert material of inorganic origin is injected into the recirculation circuit for the sludges. As understood, the process according to the present invention comprises three successive stages:

1) The inert material of inorganic origin is injected as particles, continuously or non-continuously, into the activated sludge recirculated at the head of the treatment, so that it progressively reduces the organic part of the activated sludge by thus forming a mixture characterized in that its organic fraction is reduced to 40 to 65%;

2) The presence of the inert material in the form of a homogeneous mixture with the activated sludge contributes to formation of flocs which are structured and, in addition, are of increased weight with respect to a conventional activated sludge, which leads to a modification in the selection pressure of the species of the activated sludge;

3) The extraction of the excess sludge is carried out continuously and without separation of the injected material, the continuous losses in the material discharged at the same time as the excess sludge being continually compensated by additions of fresh material.

A description will now be given, as non-limiting examples, of various embodiments of the process which is the subject of the invention.

The inert material of inorganic origin is injected continuously or non-continuously, in the form of a suspension or in the pulverulent state, at a judiciously determined point on the treatment line, preferably in the recirculation circuit for the sludges. This material, immediately after its injection, disperses homogeneously in the activated sludge, constituting a new base for the structure of the flocs thus formed. The presence of this inorganic material (which is an inert material and not a flocculating agent) in the newly formed floc leads to a replacement of part of the organic biomass by this inert inorganic material. The result thereof is a decrease in the organic fraction. The newly formed biomass contains from 40 to 65% of organic matter, the remainder consisting of the inert material thus injected.

Figure 1:
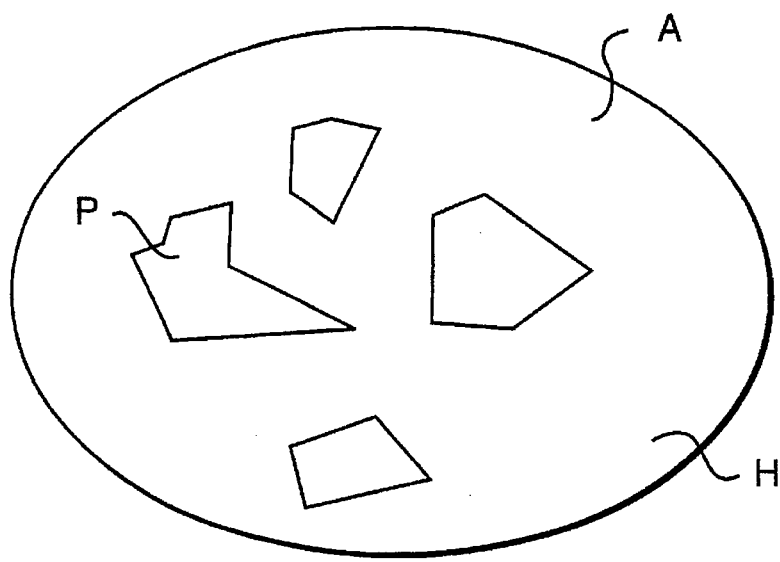
FIG. 1 is a schematic representation of floc enveloping particles of an inert inorganic material added to activated sludge, the floc including a mixture of bacteria.

The activated sludge/inert material mixture thus constituted arrives at the head of the process, the latter comprising an anoxic region followed by an aerated region. In the absence of oxygen in the dissolved form and of air bubbles, selection of the microorganisms takes place first of all in this anoxic medium, the favored microorganisms being those capable of using an electron acceptor other than dissolved oxygen, in this case nitric nitrogen. They are heterotrophic microorganisms, which constitute the outer floc, enveloping one or a number of particles P of the inert material (see FIG. 1 in the appending drawings). The more or less "granular" structure of the flocs makes it possible for the heterotrophic bacteria H to preferentially grow on the periphery of the floc. The following stage takes place in the aerated medium. As seen in this FIG. 1, the autotrophic bacteria A then come to be fixed within the newly formed floc, partially fixed to the surface of the particles of the material and partially in the flocculated state, thus reducing the significance of the parameter consisting of the age of the sludge.

The conditions influencing the selection of the bacterial species thus comprise successive anoxic and aerobic periods. The aerated medium, which promotes development of the autotrophic bacteria responsible for biological nitrification, contributes to the selection of these species, but only when conditions favourable to the growth of these autotrophic bacteria are combined. A low organic load, an appropriate and temperature-dependent sludge age and a sufficient dissolved oxygen concentration figure among these optimum conditions.

When the organic load is too high, competition between the autotrophic and heterotrophic bacteria turns to the net advantage of the heterotrophic bacteria, by virtue of their rate of growth, which is several times greater than that of the autotrophic bacteria. When the age of the sludge is too low, the low rate of growth of the autotrophic bacteria may not provide for their renewal and their progressive leaching results in a considerable reduction in the nitrification abilities.

The injection into the recirculating sludge of the inert inorganic material according to the present invention, which promotes the formation of a restructured sludge, makes it possible to reduce extraction volumes, which is reflected by an increase in the concentration of the biomass present in the reactor. This has the consequence of making possible the growth of an autotrophic bacterial population which would otherwise not find a place in the medium. This growth of autotrophic bacteria makes it possible to cross purification thresholds which are different from those obtained by a conventional purification, by virtue of the decrease in the level of polluting load applied to the microorganisms, and thus to nitrify. In other words, when a conventional activated sludge process does not make possible nitrification due to an excessively high organic load or to an excessively low sludge age, a process assisted by the inert inorganic material succeeds, despite these disadvantages, in nitrifying and consequently in denitrifying.

The more inorganic structure of the sludge modified by the invention by the presence of the inert inorganic material gives this sludge excellent physical characteristics from the viewpoint of its abilities to thicken and to dewater. This characteristic is in particular appreciated in sludge treatment where savings in polymers and other additives are thus possible.

The characteristics of an inert inorganic material which can be used in the implementation of the process of the invention have been mentioned below, as non-limiting example:

| | |
|---|---|
| active particle fraction: | 50–250 microns |
| true density: | 2000–3000 kg/m$^3$ |
| quantity injected: | between 80 and 150 g/m$^3$ of water |
| circulation power requirements: | >25 W/m$^3$ of the tank |
| composition of the newly | 40–65% of organic mat. |

| | |
|---|---|
| formed sludge: | and 60–35% of inert inorganic mat. |
| example of inert material: | kaolin clay, resulting from the exploitation of kaolin. |

Figure 2:
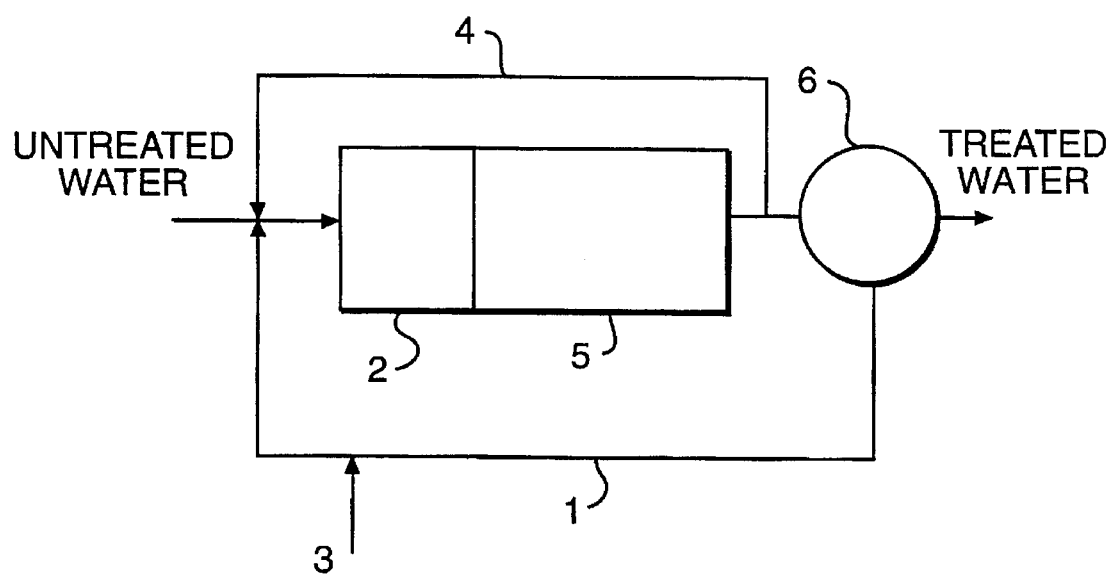
FIG. 2 is a flow chart of a first example of the invention.
Figure 3:
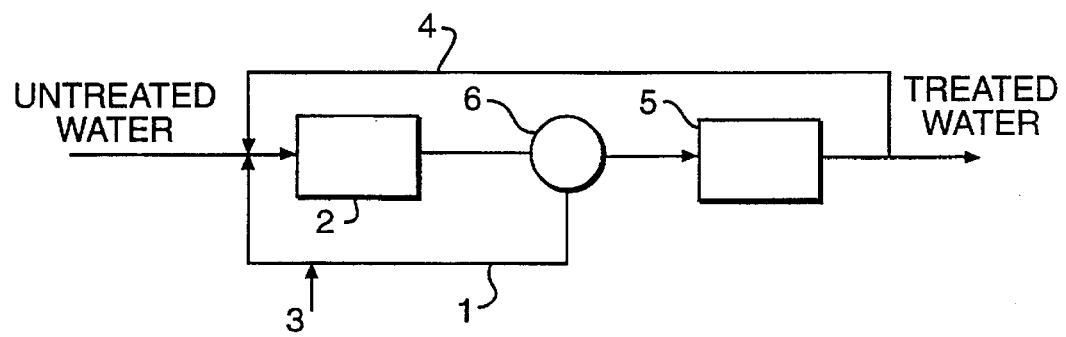
FIG. 3 is a flow chart of a second example of the invention.
Figure 4:
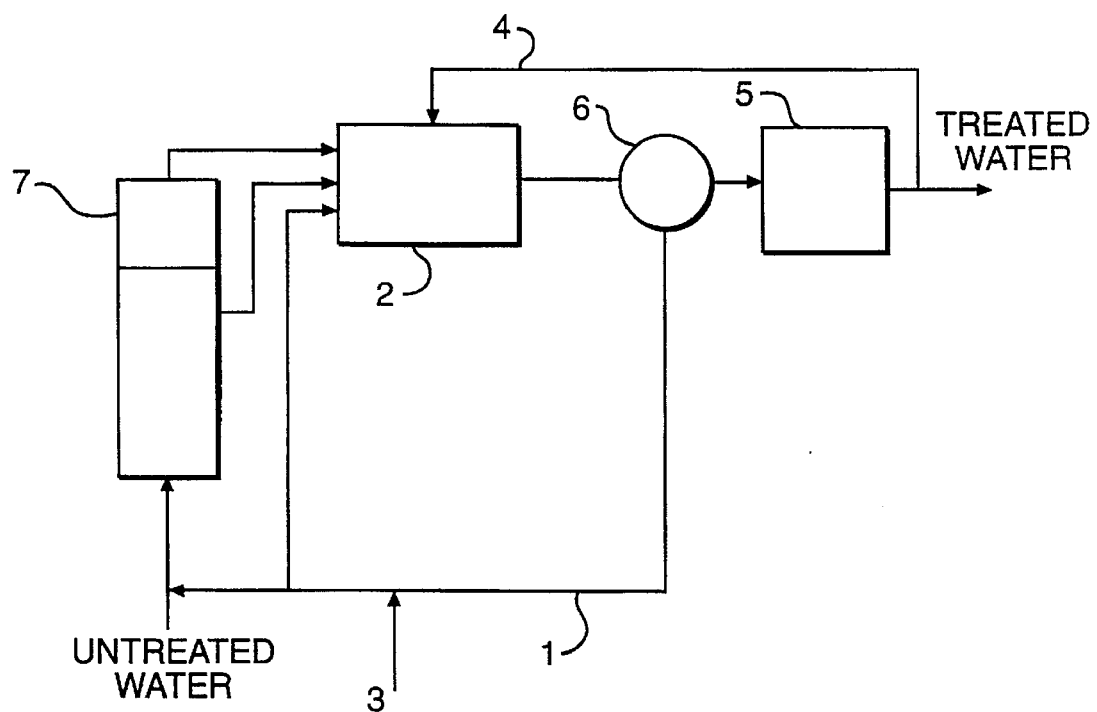
FIG. 4 is a flow chart of a third example of the invention.

Descriptions will be given below, with reference to FIGS. 2 to 4, of the embodiments of the process which is the subject of the present invention. FIGS. 2 to 4 schematically represent plants for the treatment of liquid effluents, in particular of waste water, by the activated sludge process.

EXAMPLE 1 (FIG. 2)

The plant of known type comprises an anoxic region 2 at the head, followed by an aerated region 5 and a clarification/ settling region 6. The inert inorganic material is injected at 3 into the sludge recirculation circuit 1, so as to be quickly homogenized in order to form the new structure of the flocs defined above. The nitrate-rich mixed liquor 4 is recirculated at the head, in the anoxic region 2.

EXAMPLE 2 (FIG. 3)

According to the invention, the inert inorganic material is injected at 3 into the circuit 1 for recirculation of the sludges arising from the settling tank 6. The system comprises a stage for denitrification 2 by the activated sludge in an anoxic tank 2 at the head. The nitrification stage is provided for in this case by a fixed-culture process 5, as tertiary nitrification. The liquor containing the nitrates 4 is recirculated to the anoxic tank 2. In this implementational example, selection of the species is carried out solely in anoxic medium. Thus, only the heterotrophic population is present. Part of the latter is fixed on the particles of the inert inorganic material, the other being found in the floc which surrounds the inorganic core. Apart from the absence of autotrophic bacteria, the characteristics of such a granular sludge are the same as those described above.

EXAMPLE 3 (FIG. 4)

Here again the inert inorganic material is injected at sludge recirculation 1 into a system which comprises a stage for denitrification by the anoxic region 2, preceded by a sludge bed reactor 7 operating in anaerobic mode. Nitrification is carried out by a fixed-culture process 5, as tertiary nitrification. The liquor containing the nitrates 4 is recirculated to the anoxic tank 2 at the head of the plant. The principle of this embodiment is similar to that of Example 2.

The possibility was mentioned above of rehabilitating, by virtue of the process of the invention, existing activated sludge plants which are overloaded or which present hydraulic and/or biological problems. During such a rehabilitation, the process according to the present invention contributes the following results:

- increase in the concentration of the sludge in the system, which is reflected by a reduction in the applied sludge loading;
- modification of the conditions influencing the selection of the species which makes possible cohabitation of the heterotrophic and autotrophic bacteria, even under conditions less favourable for autotrophic bacteria;
- possibility of nitrifying and denitrifying by the same culture consisting of autotrophic bacteria, partially fixed on the inert inorganic material, and free heterotrophic bacteria, even under conditions in which conventional activated sludge no longer nitrifies;
- production of an optimum sludge structure based on one or a number of particles of the inert inorganic material, this structure being of increased weight, which removes any problem of separation by settling;
- extraction of a sludge of excellent quality for the purpose of subsequent treatment, which makes possible savings in materials conventionally used.

Of course, it remains the case that the present invention is not limited to the implementational and applicational examples mentioned here but that it encompasses all the variants thereof.

We claim:

1. A process for treating waste water that is pretreated mechanically, comprising the steps:

providing waste water for treatment;

mixing the waste water with activated sludge;

creating a biomass in the form of flocs in suspension;

settling the resulting mixture to separate treated water from thickened sludge;

recycling the thickened activated sludge for mixing with newly provided waste water;

injecting, into the recycled sludge, a fine granular inert and inorganic material wherein particles of the material are immersed by the sludge to reform the suspended flocs with greater weight;

immediately dispersing the material in the sludge in a homogeneous manner;

creating a resulting mixed culture simultaneously including, in a single bacterial floc
  (a) free heterotrophic species, that constitute the outer floc, enveloping at least one inert particle; and
  (b) autotrophic species partially fixed on the at least one particle of the material and partially in the floculated state;

the mixture of the activated sludge and of the injected material having an organic matter composition in the range of between 40 and 65%, the remainder being the inert material; and extracting excess sludge continuously and without separation of the injected material.

2. Process according to claim 1 wherein the injection of the said inert inorganic material is carried out continuously.

3. A Process according to claim 1 wherein the injection of the said inert inorganic material is carried out non-continuously.

4. Process according to claim 1 wherein the injection of the said inert inorganic material is carried out in the form of a suspension.

5. Process according to claim 1, wherein the injection of the said inert inorganic material is carried out in a pulverulent form.

6. Process according to claim 1 wherein said inert inorganic material has a density greater than 2000 kg/m$^3$ and a particle size of the order of 50 to 250 microns and a good ability to fix the biomass.

7. Process according to claim 1 wherein the inert inorganic material is injected in a proportion of the order of 80 to 150 g/m$^3$ of water.

8. Process according to claim 1 wherein the inert inorganic material is kaolin clay, resulting from the exploitation of kaolin.

9. The process set forth in claim 1 wherein the resulting mixed culture is subjected to an anoxic/aerobic medium.

10. The process set forth in claim 1 wherein the resulting mixed culture is subjected to an anoxic/anaerobic medium.

11. A process for treating waste water that is pretreated mechanically, comprising the steps:

provantage waste water for treatment;

mixing the waste water with activated sludge;

creating a biomass in the form of flocs in suspension;

settling the resulting mixture to separate treated water from thickened sludge;

recycling the thickened activated sludge for mixing with newly provided waste water;

injecting, into the recycled sludge, a fine granular inert and inorganic material wherein particles of the material are coated by the sludge, the inorganic material having a density greater than 2000 kg/m$^3$ and a particle size of the order of 50 to 250 microns and a good ability to fix the biomass, and further being kaolin clay, resulting from the exploitation of kaolin;

immediately dispersing the material in the sludge in a homogeneous manner;

creating a resulting mixed culture simultaneously including, in a single bacterial floc, both free heterotrophic species and autotrophic species partially fixed on particles of the material within the floc;

the mixture of the activated sludge and of the injected material having an organic matter composition in the range of between 40 and 65%, the remainder being the inert material; and extracting excess sludge continuously and without separation of the injected material.

* * * * *